United States Patent
Barboza

[11] Patent Number: 5,334,451
[45] Date of Patent: Aug. 2, 1994

[54] CONTINUOUS FILAMENT YARN PRECOAT SEPTUM

[75] Inventor: Steven D. Barboza, Baltimore, Md.

[73] Assignee: Memtec America Corporation, Timonium, Md.

[21] Appl. No.: 51,540

[22] Filed: Apr. 26, 1993

Related U.S. Application Data

[63] Continuation of Ser. No. 844,460, Mar. 2, 1992, abandoned, which is a continuation-in-part of Ser. No. 395,512, Aug. 18, 1989, abandoned.

[51] Int. Cl.$^5$ .............................................. D02G 3/00
[52] U.S. Cl. ..................................... 428/377; 428/370; 428/372; 428/375; 428/398; 210/494.1; 210/497.1; 210/497.01
[58] Field of Search ............ 210/494.1, 497.1, 497.01, 210/629, 628, 490, 505; 428/370, 372, 375, 376, 377, 378, 398; 57/208, 227, 289

[56] References Cited

U.S. PATENT DOCUMENTS

| | | | |
|---|---|---|---|
| 4,610,131 | 9/1986 | Eschenbach | 57/227 |
| 4,761,231 | 8/1988 | Tomita et al. | 210/497.1 |
| 4,904,380 | 2/1990 | Bhanot et al. | 210/497.01 |
| 5,215,661 | 6/1993 | Tanabe | 210/497.01 |

Primary Examiner—Patrick J. Ryan
Assistant Examiner—N. Edwards
Attorney, Agent, or Firm—Waldron & Associates

[57] ABSTRACT

A precoat septum in the form of a winding onto a core of textured yarn produced of continuous filaments of an organic or inorganic material. The yarn is texturized by air blowing a plurality of said filaments utilizing an air jet, and drawing off the filaments at a speed which is lower than the speed at which they enter the jet so that the resulting yarn is characterized by the filaments having a plurality of random entangled loops.

24 Claims, 1 Drawing Sheet

CONTINUOUS FILAMENT YARN PRECOAT SEPTUM

This is a continuation of application Ser. No. 07/844,460, filed Mar. 2, 1992, which is in turn a continuation-in-part of application Ser. No. 07/395,512, filed Aug. 18, 1989, both now abandoned, the benefit of each of which is hereby claimed under 35 U.S.C. 120.

BACKGROUND OF THE INVENTION

1. Technical Field

This invention relates generally to precoat filters and to precoat septa, and more particularly to a new and improved precoat septum utilizing an improved winding formed of yarns produced from continuous filaments. Such filters and septa are useful in industrial filtration.

2. Prior Art

A precoat filter comprises a particulate filter medium, such as an ion exchange resin or a diatomaceous earth or comparable material, deposited or "precoated" onto a supporting septum. In operation, a fluid is passed through the particulate precoat where undesirable materials are taken up by the filter medium. The filtrate passes through the septum and out of the filter.

In some cases, the septum is provided in the form of a spiral winding of yarn applied over a porous tubular core. The septum of the present invention is of this type, and the following discussion and disclosure is addressed to that context.

In such precoat septa, the yarn winding does not serve as a filter medium, but rather as a permeable surface upon which a layer of materials such as powdered ion exchange resin or diatomaceous earth are deposited. Such materials layered onto the outer surface of the yarn winding ionically attract and/or retain the particulate matter as the liquid influent flows into and through the yarn medium. When the outer layer of precoat filter medium become sufficiently loaded with solids that flow therethrough becomes restricted, the septum is backwashed to dislodge the particulate filter medium, and its load of debris, from the septum surface and wash it away. Thereafter, a new powdered ion exchange resin coating is applied to the winding surface, and the septum is reused until it again becomes loaded. It is intended therefore, that such septa be backwashed and reused many times.

The yarns utilized in precoat septa and the technique for winding the yarns onto the support core to produce an effective septum must be carefully selected and matched in order to achieve the degree of permeability, precoat retention, backwashing effectiveness, and service life desired. The yarns most often utilized have been spun yarns made of staple fibers; i.e., typically natural fibers such as cotton or chopped man-made fibers, either of which are composed of short fibers, typically less than three inches in length, twisted together to form a continuous length of yarn, as is essential to effect a useful degree of cohesiveness to the fibers and a degree of tensile properties in the resulting yarn. Continuous filament yarns have not been used in precoat septa, generally because they lack the numerous fiber ends which extend from surface of spun staple yarns.

Precoat septa are similar in terms of design and construction to spiral wound tubular filter cartridges but are also different in some important respects.

Spiral wound tubular filter cartridges are well known in the art, and typically comprise a perforated tubular support core having a winding of yarn wrapped thereon which serves as the filter medium.

Unlike filter cartridges, where particle entrapment must be effected throughout the depth of the yarn winding filter medium, it is essential in precoat septum applications that particle entrapment be minimal within the body of the yarn winding. That is to say, in a cartridge filter, the cartridge is normally utilized until it becomes plugged or nearly plugged, and then it is discarded. Therefore, particle entrapment throughout the entire depth of the filter medium is essential to optimize the filter's usefulness. In the case of the precoat septa, however, backwashing is an essential requirement so that the device can be cleaned and reused over and over again. Ideally, therefore, particle entrapment within the depths of the winding is not desired, since particles entrapped within the depth do not wash out effectively. Accordingly, the yarn winding on a precoat septum is preferably wound to assure a tighter pore size, relative to the dimensions of the particulate filter medium, to prevent particulate matter from entering the depth of the yarn winding.

In practically all wound cartridge applications, the utilization of staple fiber yarns has generally been deemed essential to effect the filtration desired. This is because the yarn is characterized by a high degree of bulk or surface "hairiness" caused by the protrusion of the ends of short fibers from the main body of yarn. Accordingly, when the yarn strands are wound onto the filter support core to provide a medium consisting of a plurality of adjacent and overlaying yarn strands, the short lengths of fiber extend into and across the open spaces between the adjacent strands of yarn.

In filter cartridges where the yarn winding functions as the filter medium, the surface hairiness serves the additional function of entrapping the particulate matter so that the projecting fiber ends are themselves a primary filtering element. As a result, the winding ratio can be adjusted to provide a more open yarn pattern in the winding which, in turn, provides higher flow rates of filtrate through the winding. These same concepts and materials have also employed in the design and manufacture of conventional precoat septa despite the fact that these devices are intended to serve functions distinct and separate from those of a filter cartridge as previously described.

The hairy characteristic of the yarn, while still deemed essential to prevent overpacking (i.e., a tight winding pattern) even in precoat septa, does create disadvantages in that the hairiness tends to prevent an even coating of the powdered ion exchange resin or other precoat material, and further tends to interfere with the subsequent complete removal of the spent precoat from the winding surface during the backwashing operation. In addition, experience has shown that such yarns do not have sufficient tenacity and mechanical toughness to withstand the rigors of repeated backwashing to the extent desired, so that the yarns are easily frayed and surface hariness is increased-creating an undesirable, non-uniform surface which prevents the formation of a uniform precoat and may permit shedding of staple fibers from the septum winding into the filtrate and eventual bleedthrough of the precoat material. Such shedding of septum yarn fibers contaminates the filtrate and is unacceptable in most filtration operations. Bleedthrough of the precoat, of course, is a serious failure. It reduces the filtering and treatment effect and cannot be tolerated to any measurable degree. Similarly, a non-uniform precoat thickness permits the passage of fluid which has not been completely filtered nor treated, thereby defeating the function of the septum. Under any of these conditions, filtration must be stopped, the filter vessel opened, and the septum replaced. Since depth filters are not ordinarily backwashed, these considerations are irrelevant to their context of operations and their structure.

Additionally, yarns spun of staple fibers have an undesirable degree of non-uniformity with respect to strength, weight and surface characteristics, making it particularly difficult to manufacture a precoat septum with consistent performance characteristics and quality.

Yarns produced from continuous fibers or filaments also do not normally provide the balance of permeability, uniform precoat formation, precoat retention, and backwashability desired in precoat septa. This is because the continuous filaments from which the yarns are produced are not short strands, but rather are continuous strands, being as long or longer than the yarn itself, are longitudinally oriented, tending to be reasonably straight and highly parallel, and do not have the protruding fibers, i.e., surface "hairiness", that is essential to achieve particle retention and adequate permeability. Due to the lack of protruding fibers and bulk, such yarns are not particularly effective in retaining the precoat material on the surface of the septum. If the winding pattern is adjusted to reduce the size of the apertures between adjacent yarn strands to compensate for the lack sufficient hairiness, and to thereby provide for adequate retention, the permeability of the wound structure becomes excessively restrictive to fluid flow. The utilization of continuous filament yarns, however, is desirable to some extent since durability and effective backwashing performance is obtained.

As a solution to the above problems, the utilization of a "textured" continuous filament yarn has been employed in spiral wound depth filter cartridges. Such yarns are characterized by fibers which have been given a "kink", "coil", "figure", "crimp", or some such geometric form other than straight by any one of a number of known processes, such as "false twist" "knit-deknit" "stuffer box" "air jet texturing" and other such processes to provide a "textured" or "bulked" characteristic to the resulting yarn. Such bulked or textured yarns, however, are not suitable for precoat septa. In the manufacture of precoat septa, high winding tension is essential to produce winding with sufficient surface hardness and structural integrity to withstand the stress of repeated backwashing. The tensions utilized tend to pull-out and straighten the textured fibers, so that the yarn, when wound on the support core resembles those of straight, untextured fibers, exhibiting the overpacking tendency and permeability limitation described above. The filaments of the yarn will tend to spread to form a homogeneous filamentary layer; see Tomita, et al., U.S. Pat. No. 4,761,231. Such a structure has several attractions for depth filters, but are not desirable or acceptable for precoat septa. First, and most importantly, the hydraulic resistance of the winding is materially increased by the close packing and the spreading of the filaments of the yarn, reducing filtrate flow or requiring higher pressure differentials across the winding. Next, the strength of the winding, particularly under backwash conditions may be compromised. Spiral wound depth filters are generally not backwashable, and are normally discarded when fouled, and have no need to withstand the rigors of backwash procedures.

SUMMARY OF THE INVENTION

This invention is predicated upon a new and improved precoat septum and particularly a winding therefor produced from a textured yarn manufactured of filaments of an organic polymeric material; e.g., polyolefin, polyester, polyamide, etc., or inorganic material; e.g., glass, carbon or graphite fibers, formed into yarn by an air jet texturizing process, sufficient to produce randomly oriented, entangled loops in the yarn fibers, where the extent of entanglement is sufficient to prevent loss of the bulking under winding tension, and to preclude substantial spreading to form a homogeneous layer.

One commercial process for producing such a yarn is well known in the yarn art, namely the Taslan process, developed by E. I. du Pont de Nemours Company. Taslan is a registered trademark of E. I. du Pont de Nemours Company, Wilmington, Del. Taslan processed yarns are commonly employed in apparel, and other typical textile uses.

Septa formed in accordance with the present invention have high permeability, i.e., low hydraulic resistance to filtrate flow, enhanced long term integrity and durability when subjected to repeated backwash cycles, high initial and long term uniformity, life and reliability. The incidence of septum failure and shedding of filaments from the septum winding are materially reduced.

DETAILED DESCRIPTION OF THE INVENTION

Figure 1:
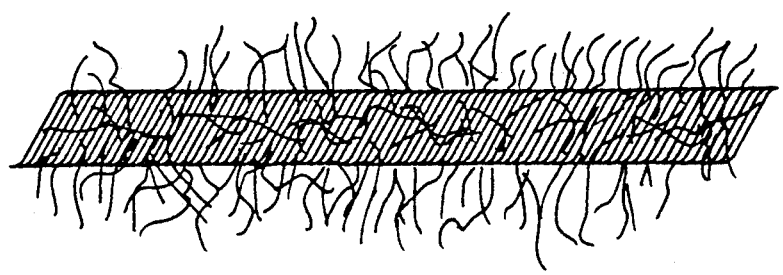
FIG. 1 is a drawing illustrating the characteristics of a yarn made of staple fibers.
Figure 2:
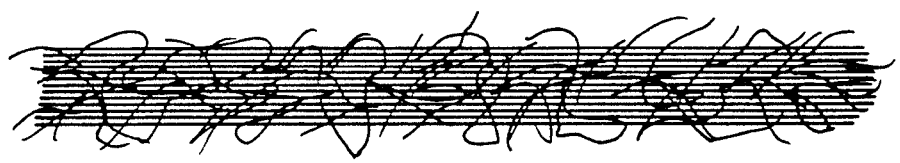
FIG. 2 is a drawing illustrating the characteristics of a Taslan yarn made of continuous filaments.

In the Taslanizing process, a plurality of continuous filaments are longitudinally oriented and fed through one or more air jets to take-up rolls which draw off the fibers at a speed which is less than the speed at which they are fed to the air jet. Since the take-up speed is slower than the feed speed, yarn slack is created in the jet where it is exposed to a turbulent air stream causing the formation of many randomly spaced and entangled loops in the individual fibers. Operating parameters such as jet design and air speed, take-up speed, tension and the like, can be varied significantly to effect a range of loop sizes, frequency and orientation to provide considerable versatility in the process. The looped characteristic of the filaments normally increase the sectional volume of the yarn by factors of from 50 to 200 percent. The yarn may be provided with a twist, or a false twist, if desired, but these features are not commonly employed. Even though the individual filaments remain continuous, the loops do afford the yarn more of the characteristic of a yarn composed of staple fibers, most notably the loops protrude from the surface to provide a surface "hairiness" similar to that normally provided by the staple fiber ends in staple yarns. The extent of the entanglement assures that the loops and entanglements are not pulled out during winding or in use.

The yarns to be employed are preferably polypropylene, although other polymers, such as other polyolefins, poly(phenylene sulfide), poly(ether-ether ketone), polybenzimidazole, polyamides, polyethylene terephalate polyesters, such as Dacron ® and the like may be employed in particular contexts where the environment of use dictates and justifies the additional cost. Inorganic fibers, particularly glass fibers, carbon fibers, graphite fibers and the like may also be used. Fibers may also be blended in a variety of composite yarns if desired. The Taslan process also lends itself to blending of yarns of different polymers, denier per filament (DPF), number of filaments, or total (yarn) denier. A preferred yarn for most applications is made up of two 100% polypropylene multifilament yarns, each of 2520 denier, and made up of 420 filaments of 6 denier each. The two yarns were combined and simultaneously textured utilizing the Taslan air jet texturing method, to form a single textured yarn of 5929 total denier/840 filaments. The textured yarn denier of 5929 resulted from the combination of the two 2520 denier feed yarns plus a 17.6% increase in total denier caused by the looping of the individual filaments composing the textured yarn. Typically the yarn will have a total denier of from about 3,000 to about 10,000, and the individual filaments have a denier of from about 0.5 to about 20. In most circumstances, it is preferred that the yarn have no twist, although a yarn having up to about 20 turns per meter is readily effective. The presence or absence of other forms of yarn bulking or texturing are generally irrelevant to the present invention, as such characteristics, if present in the yarn prior to winding, are lost under the tension of the winding procedure. It is certainly not cost effective to apply such techniques to the yarn for the practice of the present invention, although there is no reason such features cannot be present if such yarn is available.

Due to the above described characteristics of Taslanized yarns, the yarns can be wound even under considerable tension without loosing their textured characteristics. The filaments do not spread to form a homogeneous filamentary layer, and the individual yarn strands of each turn of the winding remain discrete, plainly visible and separate from adjacent turns. The gap between adjacent turns is "filled" by the entangled loops projecting from the yarn. In addition, the yarns exhibit the strength and toughness characteristics of continuous filament yarns. Therefore, the use of such yarns as a winding in precoat septa, enable the yarn to be as tightly wound as necessary to effect the desired pore size (precoat retention) without loosing the yarn's bulkiness and low hydraulic resistance, and further permits the yarn to withstand a greater degree of backwashing without structural degradation, as compared to the yarns of the prior art.

While the yarn fibers are continuous, the projecting entangled loops provide a hairiness comparable to the projecting fiber ends of staple fiber yarns, and when the degree of entanglement is sufficient to prevent the loops from being pulled out during winding, the projecting loops provide substantially similar characteristics as the hairiness of staple fiber yarns. When compared to non-textured filament yarns the winding pattern can be mole open to provide low hydraulic resistance and high filtrate flow rates through the septum. Yet, the looped continuous fiber yarn is more uniform than the yarns produced from staple fibers, thereby permitting a more uniform coating of resin, and permitting a more complete removal of spent resin during the backwashing operations. Because of the greater degree of uniformity of the yarn and direct control of the winding produced therefrom, manufacturing scrap can be decreased and manufacturing efficiency increased, while also permitting the manufacture of precoat septa with excellent and consistent performance characteristics, particularly under backwash conditions.

The yarns employed in the present invention can be wound in conventional fashion using the commonly available equipment normally employed without adaptation, in a manner wholly familiar to those of ordinary skill in the art. The particular winding conditions and parameters are controlled in usual fashion to produce the characteristics consistent with and appropriate for the particulate filter medium to be applied to the septum, in known fashion. The winding is generally applied in the common diamond pattern spiral winding familiar to the art. In most precoat filter applications, the particulate material will have substantial particle diameters, over a relatively broad range of variation. See Table I, below, for example. It is generally desirable to maintain the winding as open as consistent with the requirement for retaining the filter medium. If the pore size is smaller than required in service, the hydraulic resistance will be needlessly high.

It is generally desirable to minimize the thickness of the winding or to adapt the winding technique to minimize hydraulic resistance and maximize the flow of filtrate through the septum. In most cases, a winding depth of about 0.18 inch (0.46 cm) is convenient and effective, to produce a septum having an outside diameter of 1 to 1⅛ inches (2.5 to 2.9 cm) on a 0.63 to 0.77 inch (1.6 to 2.0 cm) core, diameter which is one common industry size requirement. Such a septum has high initial and sustained flow rates, reflecting low hydraulic resistance. Other common size requirements are for 1.75 to 2 inch (4.4 to 5.1 cm) outside diameter. Since the industry standard housings for such septa are consistent with a 1.09 inch (2.77 cm) core diameter, a winding depth of ⅜ to ½ inch (0.95 to 1.27 cm) can be employed. If hydraulic resistance proves to be excessively or undesirably high, one or more of several adaptations can be employed to enhance permeability.

If the winding tension is varied during the winding, from a rather low level during the initial, inner turns up to, about half the depth, and higher tension is employed for the latter turns, the surface of the winding will have the desired characteristics to perform as a septum, which the interior of the winding will have greatly reduced hydraulic resistance and enhanced flow characteristics. The tension may be changed gradually and progressively to a maximum for the last 0.18 inch (0.46 cm) or so, or it may be increased in one or more steps at different levels in the winding.

Note that this is the reverse of the expedient sometimes employed in the manufacture of spiral wound depth filters, of progressively decreasing winding tension as the depth of the winding increases. Such techniques serve a different purpose for depth filters. Those techniques find greatest applicability in increasing the amount of filtered debris that can be held within the depth of the winding, and are particularly applied where the material to be filtered contains foreign materials in a particularly broad particle size range. By varying the winding tension, the largest particles are removed in the more open windings near the surface, while finer particles are removed deeper in the winding nearer the core. Such a technique is not applicable to precoat septa, which are designed to collect particulate material on the surface of the winding with little or no penetration into the depth to allow the particulate material to be effectively removed by backwashing.

In another adaptation, the effective diameter of the core can be increased by applying one or more plies of a highly porous separator material, such as an extruded polymer mesh or perforated polymer film. Such materials are generally known to those of ordinary skill in the filtration art, as such materials are employed as outer coverings for a number of types of pleated filters. Generally any of the commonly employed materials can be employed so long as the polymer of the mesh or film is compatible with the environment of use of the septum. Such materials as polyolefins, i.e., polyethylene, polypropylene, and the like, Nylon polyamides, and variety of other polymers are employed in the art and are generally known to those of ordinary skill. When such materials are employed, they may be wrapped around the core to increase its diameter, or one or more plies may be "buried" within the wraps of the winding at one or more levels within the depth of the winding. It is generally preferred that such inclusions in the winding not be closer than about 0.18 inch (0.46 cm) to the surface of the septum winding, however.

It is also possible to alter the winding conditions, particularly the density of the winding by changing the wind ratio to produce a segment in the interior of the winding with a very open diamond pattern (low density), and to change the ratio in one or more steps as the winding progresses, so that the pattern at the surface produces the required, relatively smaller pore, tighter winding.

Other yarn types, such as course fibrillated slit film yarn or continuous filament yarn with high denier per filament (DPF), for example, may also be incorporated in the depth of the winding to increase permeability.

EXAMPLE 1

To illustrate the present invention, a septum was produced utilizing two 100% polypropylene multifilament yarns of 2520 denier having 420, 6 denier filaments in each. The two yarns were combined and simultaneously textured utilizing the Taslan air jet texturing method, to form a single textured yarn of 5929 total denier/840 filaments. The textured yarn denier of 5929 resulted from the combination of the two 2520 denier feed yarns plus a 17.6% increase in denier caused by the looping of the individual filaments composing the textured yarn.

A tubular septum was constructed by winding the above yarn on a perforated, metallic support core using a precision cross winding machine. The amount of tension placed on the yarn during the winding process and the pattern in which the yarn was wound onto the support core were selected to produce a septum with desired permeability, retention and backwashing characteristics. The weight of the resulting septum winding was 566 grams and its density was 0.40 g/cm³. The dimensions of the tubular septum were 1.75 inches (4.45 cm) outside diameter, by 1.09 inches (2.77 cm) inside diameter by 58.38 inches (148.3 cm) long, excluding end fittings.

The ability of the septum to provide a satisfactory and reusable surface for the formation of a uniform and effective resin precoat was evaluated by precoating the septum with ion exchange resin, visually examining the condition of the precoat and septum during and after formation, testing the coated septum for contaminate removal efficiency and contaminate holding capacity (life), backwashing the septum, and then repeating this entire test sequence several times.

The ion exchange resin utilized was a powdered, mixed cation/anion resin manufactured by Epicor, Inc., and designated by the manufacturer as Epifloc 91 H. A particle size analysis of the resin, performed by an independent laboratory is shown in Table 1. An aqueous slurry was prepared with a resin concentration of 4% by weight. The slurry was injected at a flow rate of 600 milliliters per minute into the inlet water flow of 5 gallons per minute (GPM) (18.9 liters per minute) to build the precoat.

The coated septum was subjected to life and efficiency testing using AC Fine Test Dust, supplied by the AC Spark Plug Division of General Motors Corporation, as the test contaminate. An aqueous slurry with a contaminate concentration of 25 parts per million (PPM) was prepared and was pumped to the septum housing and through the particulate filter medium and the septum in an outside to inside flow direction at a flow rate of 5 GPM (18.9 liters per minute). Samples of test fluid immediately upstream and downstream of the precoat filter were collected at the start of the test for analysis. The pressure differential ($\Delta P$) across the septum was monitored and recorded throughout the test. An electronic particle counter was used to measure the number and size of particles in the fluid samples collected. The flow through the septum was maintained until a terminal $\Delta P$ of approximately 25 pounds per square inch (PSI) (1.72 bar) was reached. The contaminate holding capacity or life of the device was calculated based on the contaminate concentration, flow rate, and test duration.

Upon completion of the life and efficiency test, the septum was backwashed by introducing compressed air at a pressure of 90 PSI in the reverse flow direction (inside to outside) and simultaneously draining the septum housing. The housing was then refilled with water and the backwashing process was repeated twice providing a total of three backwashing cycles. After the final backwash, the entire test sequence, i.e., precoating followed by life and efficiency testing followed by three backwashing cycles, was repeated four times thereby exposing the septum to five complete test cycles.

The particle removal performance of the septum is stated in terms of measured particle sizes at particular levels of efficiency. The efficiency and life results for each of the five test cycles is presented in Table 2. Three different efficiency levels, i.e., 90%, 95%, and 98% are listed to summarize the particle removal performance of the septum. A particle size, in micrometers ($\mu$m), is listed for each efficiency level. Ninety percent efficiency means that the septum removed 90% of the particles of the size listed. The test data and observations made during the test indicate that the septum provides a satisfactory surface for precoat formation, that the precoated septum is effective in retaining 0.9 to 1.9 $\mu$m particles at the 90% efficiency level, and that the septum can be effectively backwashed and reused repeatedly without structural degradation or a significant increase in differential pressure.

TABLE 1

| Resin Particle Analysis | |
|---|---|
| Particle Size ($\mu$m) | % by Weight |
| 5–10 | 0.4 |
| 10–15 | 1.1 |
| 15–25 | 5.4 |

TABLE 1-continued

Resin Particle Analysis

| Particle Size (μm) | % by Weight |
|---|---|
| 25–50 | 24.7 |
| 50–80 | 22.4 |
| >80 | 46.0 |

TABLE 2

Life and Efficiency Results

| | Precoat Test Cycle | | | | |
|---|---|---|---|---|---|
| | 1 | 2 | 3 | 4 | 5 |
| 90% efficiency (μm) | 1.3 | 1.9 | 1.7 | 1.0 | 0.9 |
| 95% efficiency (μm) | 1.4 | 2.1 | 1.9 | 1.3 | 1.1 |
| 98% efficiency (μm) | 1.6 | 2.4 | 2.4 | 1.7 | 1.5 |
| Contaminate Holding Capacity (grams) | 41.5 | 34.3 | 28.4 | 31.3 | 30.1 |
| Initial ΔP (PSI) | 1.6 | 1.8 | 1.9 | 1.7 | 1.8 |
| Final ΔP (PSI) | 25.0 | 26.0 | 25.5 | 25.0 | 25.0 |

The forgoing example is preferred as a simple, relatively inexpensive and yet highly effective precoat septum. It is not intended as a limiting case, however, or to exclude other embodiments and variants from the scope of the present invention, as defined in the following claims.

EXAMPLE 2

To illustrate the present invention, a septum was produced utilizing two 100% polypropylene multifilament yarns of 2520 denier having 420, 6 denier filaments in each. The two yarns were combined and simultaneously textured utilizing the Taslan air jet texturing method, to form a single textured yarn of 5929 total denier/840 filaments. The textured yarn denier of 5929 resulted from the combination of the two 2520 denier feed yarns plus a 17.6% increase in denier caused by the looping of the individual filaments composing the textured yarn.

A tubular septum was constructed by winding the above yarn on a perforated, metallic support core using a precision cross winding machine. The amount of tension placed on the yarn during the winding process and the pattern in which the yarn was wound onto the support core were selected to produce a septum with desired permeability, retention and backwashing characteristics. The weight of the resulting septum winding was 186 grams and its density was 0.41 g/cm³. The dimensions of the tubular septum were 1.12 inches (2.85 cm) outside diameter, by 0.714 inches (1.81 cm) inside diameter by 52.41 inches (133.12 cm) long, excluding end fittings.

In service, the septum of Example 2 performed exceptionally well.

I claim:

1. In a precoat septum adapted to receive and support a particulate filter medium on the surface of said septum, said septum comprising a spiral winding of a yarn supported on a porous core, the improvement comprising:
    said spiral winding is a continuous filament yarn under tension, air jet textured to the extent that said filaments form a plurality of random entangled loops, with a sufficient degree of entanglement that said loops are not pulled out under the tension as wound on said core and when subjected to backwashing.

2. The improvement of claim 1, wherein said filaments comprise a member selected from the group consisting of polyolefin fibers, polyamide fibers, polyimide fibers, polyester fibers, poly(phenylene sulfide) fibers, poly(ether-ether ketone) fibers, glass fibers, carbon fibers, graphite fibers and mixtures and blends thereof.

3. The improvement of claim 1, wherein said yarn has a total denier of from about 3,000 to about 10,000.

4. The improvement of claim 1, wherein said filaments have a denier of from about 0.5 to about 20.

5. The improvement in claim 1, wherein said winding is uniform from the core to the septum surface.

6. The improvement in claim 1, wherein said winding is under tension which is increased from the core to the septum surface.

7. The improvement in claim 1, wherein the density of said winding is less adjacent the core than at the septum surface.

8. The improvement in claim 1, wherein at least one highly porous spacer is disposed between the septum surface and the core.

9. The improvement in claim 8, wherein at least one highly porous spacer is disposed between said core and said winding.

10. The improvement in claim 8, wherein at least one highly porous spacer is disposed within the turns of said winding.

11. The improvement in claim 8, wherein said porous spacer is a highly porous polymer material comprising a member selected from the group consisting of perforated film, extruded mesh, fibrillated slit film yarn, and high denier per filament continuous filament yarn.

12. The improvement in claim 8, wherein said porous spacer is disposed at least about 0.18 inch (0.46 cm) beneath the septum surface of said winding.

13. A particulate precoat filter comprising a particulate filter medium supported on the surface of a septum, said septum comprising a spiral winding of a yarn under tension supported on a porous core, said yarn comprising a continuous filament yarn air jet textured to the extent that said filaments form a plurality of random entangled loops, said loops having a sufficient degree of entanglement that such loops are not pulled out under tension as wound on said core.

14. The particulate precoat filter of claim 13, wherein said filaments comprise a member selected from the group consisting of polyolefin fibers, polyamide fibers, polyimide fibers, polyester fibers, poly(phenylene sulfide) fibers, poly(ether-ether ketone) fibers, glass fibers, carbon fibers, graphite fibers and mixtures and blends thereof.

15. The particulate precoat filter of claim 13, wherein said yarn has a total denier of from about 3,000 to about 10,000.

16. The particulate precoat filter of claim 13, wherein said filaments have a denier of from about 0.5 to about 20.

17. The particulate precoat filter of claim 13, wherein said winding is uniform from the core to the septum surface.

18. The particulate precoat filter of claim 13, wherein said winding is under tension which is increased from the core to the septum surface.

19. The particulate precoat filter of claim 13, wherein the density of said winding is less adjacent the core than at the septum surface.

20. The particulate precoat filter of claim 13, wherein at least one highly porous spacer is disposed between the septum surface and the core.

21. The particulate precoat filter of claim 20, wherein at least one highly porous spacer is disposed between said core and said winding.

22. The particulate precoat filter of claim 20, wherein at least one highly porous spacer is disposed within the turns of said winding.

23. The particulate precoat filter of claim 20, wherein said porous spacer is a highly porous polymer material comprising a member selected from the group consisting of perforated film, extruded mesh, fibrillated slit film yarn, and high denier per filament continuous filament yarn.

24. The particulate precoat filter of claim 20, wherein said porous spacer is disposed at least about 0.18 inch (0.46 cm) beneath the septum surface of said winding.

* * * * *